J. Shaw,
Lawn Mower.

No. 83,101.    Patented Oct. 13, 1868.

Witnesses: Henry Watt, F. Gilann

Inventor: John Shaw

UNITED STATES PATENT OFFICE.

JOHN SHAW, OF BROOKLYN, NEW YORK.

IMPROVEMENT IN LAWN-MOWERS.

Specification forming part of Letters Patent No. 83,101, dated October 13, 1868; patented in England January 23, 1864.

*To all whom it may concern:*

Be it known that I, JOHN SHAW, of Brooklyn, in the county of Kings and State of New York, (formerly of Leeds, England,) have invented a new and useful Improvement in Lawn-Mowing Machines, (for which I gained a patent in England, dated January 23, 1864;) and I do hereby declare that the following is a full, clear, and exact description of the construction and operation of the same, reference being had to the annexed drawings, making a part of this specification, in which—

Figure 1:
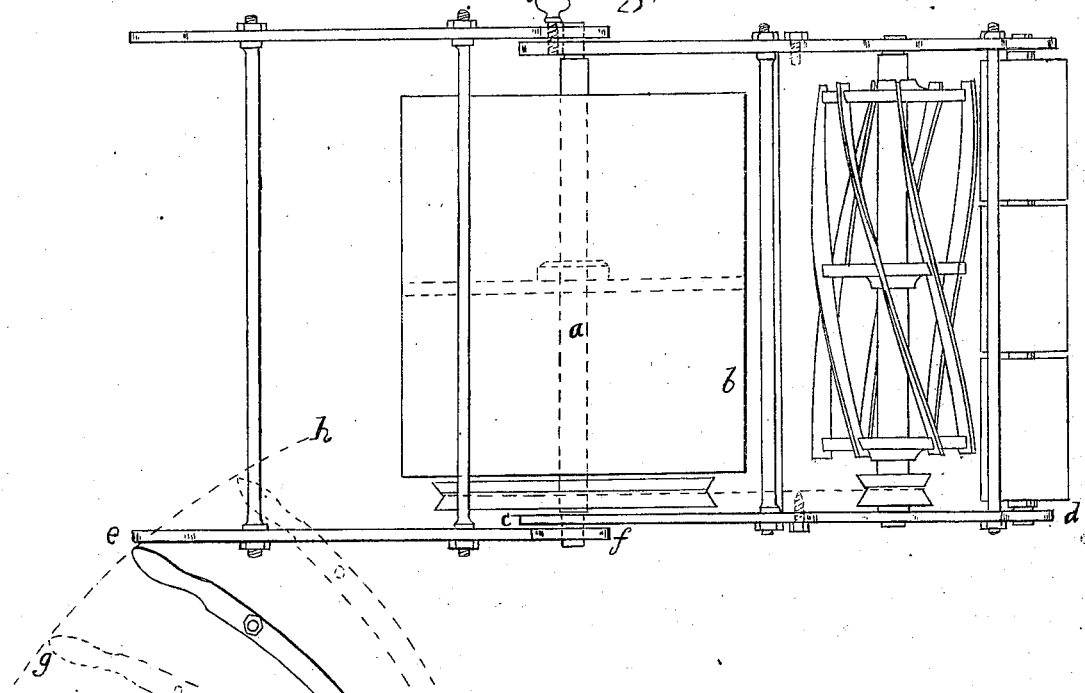
Figure 2:
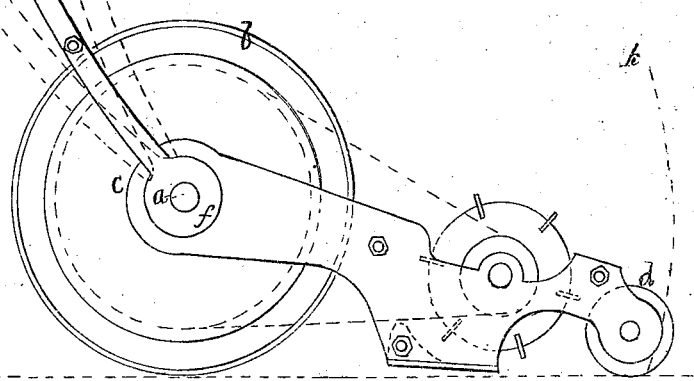

Figure 1 is a plan view, and Fig. 2 is a side elevation.

This invention relates to an improved mode of constructing the sides of the framing of lawn-mowing machines, whereby the handle ends are self adapting to any height suitable to the person operating the same; and also the ends which carry the cutters are self-adapting to the conformation of the ground, requiring no judgment on the part of the operator as to when he should raise or lower the cutters to suit unevenness of surface My improvement consists in folding up the cutting end of lawn-mowing machines towards the handle end, so that the machines may be used for rolling only without danger of injury to the cutters.

Having described the nature of my invention, I will proceed to describe its construction and operation.

$a$ is the spindle or axle of the primary driving drum or wheel $b$. From $c$ to $d$ forms the cutting end, and from $e$ to $f$ forms the handle end of one side of the framing, and both of these pieces hinge loosely and independent of each other at $a$. Thus the handle end is free to describe an arc of a circle, as from $g$ to $h$, (more or less,) without affecting the height of the cutting end, and the cutting end is also free to describe the arc $jk$ (more or less) without being controlled vertically by the handle end. By folding the cutting end still farther than $k$, and putting a pin or bolt through the two side parts, as shown at $l$, the machine may be used as a roller only.

Having thus described my invention, what I claim as my invention, and desire to secure by Letters Patent, is—

Folding the cutting end of lawn-moving machines up toward the handle end, for the purpose of being used for rolling only.

The above specification of my invention signed by me this 29th day of May, 1868.

JOHN SHAW.

Witesses:
 HENRY WITT,
 T. GILLAM.